US011004299B2

(12) United States Patent
Lyons et al.

(10) Patent No.: US 11,004,299 B2
(45) Date of Patent: *May 11, 2021

(54) SYSTEM AND METHOD FOR AUGMENTING CONTENT

(71) Applicant: SG Gaming, Inc., Las Vegas, NV (US)

(72) Inventors: Martin S. Lyons, Henderson, NV (US); Bryan M. Kelly, Alamo, CA (US)

(73) Assignee: SG Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,234

(22) Filed: Dec. 19, 2018

(65) Prior Publication Data

US 2019/0122483 A1 Apr. 25, 2019

Related U.S. Application Data

(63) Continuation of application No. 15/847,704, filed on Dec. 19, 2017, now Pat. No. 10,204,471, which is a continuation of application No. 15/589,742, filed on May 8, 2017, now Pat. No. 9,875,598, which is a continuation of application No. 14/248,053, filed on Apr. 8, 2014, now Pat. No. 9,659,447.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3206* (2013.01); *G07F 17/3211* (2013.01); *G07F 17/3225* (2013.01); *G07F 17/3237* (2013.01); *G07F 17/3239* (2013.01); *G07F 17/3244* (2013.01)

(58) Field of Classification Search

USPC .................................. 463/10, 20, 25, 39, 40

See application file for complete search history.

(56) References Cited

U.S. PATENT DOCUMENTS

| | | | | |
|---|---|---|---|---|
| 8,814,691 | B2 * | 8/2014 | Haddick ............. | G02B 27/017 463/42 |
| 8,986,125 | B2 | 3/2015 | Ellsworth | |
| 2009/0305765 | A1 | 12/2009 | Walker et al. | |
| 2010/0216533 | A1 | 8/2010 | Crawford, Jr. et al. | |
| 2010/0268604 | A1 | 10/2010 | Kim et al. | |
| 2011/0153362 | A1 | 6/2011 | Valin et al. | |
| 2012/0004956 | A1 | 1/2012 | Huston et al. | |

(Continued)

*Primary Examiner* — Adetokunbo O Torimiro

(57) ABSTRACT

Disclosed is a method and system involving augmenting content. The system augments content for an active event subject to a focus of a user, in an environment including a presentation of two or more active events. The system includes: a user focus determination unit including a camera that captures video data associated with the focus of the user; a memory and a buffer that store digital fingerprints from the events; an active content determination component that compares one or more digital fingerprints from an active event with the captured video for determination of the event being focused on by the user; and a display that displays content and augments the determined active event being focused upon by the user that was identified by the active content determination component.

20 Claims, 8 Drawing Sheets

(56) References Cited

U.S. PATENT DOCUMENTS

| | | | |
|---|---|---|---|
| 2012/0121161 | A1 | 5/2012 | Eade et al. |
| 2012/0182573 | A1 | 7/2012 | Mok |
| 2012/0239175 | A1 | 9/2012 | Mohajer et al. |
| 2012/0295698 | A1 | 11/2012 | Dernino et al. |
| 2013/0326082 | A1 | 12/2013 | Stokking et al. |
| 2014/0085333 | A1 | 3/2014 | Pugazhendhi et al. |
| 2014/0171039 | A1 | 6/2014 | Bjontegard |
| 2014/0180674 | A1 | 6/2014 | Neuhauser et al. |
| 2014/0253326 | A1 | 9/2014 | Cho et al. |
| 2015/0065214 | A1 | 3/2015 | Olson et al. |
| 2015/0286873 | A1 | 10/2015 | Davis et al. |
| 2015/0287416 | A1 | 10/2015 | Brands et al. |
| 2016/0379176 | A1 | 12/2016 | Brailovskiy et al. |

* cited by examiner

502

500

```
{
"callsign": "TNNSHD",
"date": "20130601",
"duration": 7200,
"episodeTitle": "Gerry Weber Open, First Semifinal",
"isOffAir"· false,
"isPclocked": 3,
"isPpv": false,
"isRecording": false,
"isVod"· false,
"major": 217,
"minor": 65535,
"offset": 2473,
"programId"· "10521945",
"rating": "No Rating",
"startTime": 1371592800,
"stationId": 3900938,
"status": {
"code": 200,
"commandResult": 0,
"msg": "OK.",
"query": "/tv/getTuned"
},
"title": "ATP Tennis"
}
```

*FIG. 6*

SYSTEM AND METHOD FOR AUGMENTING CONTENT

RELATED APPLICATIONS

This application is a continuation of U.S. application Ser. No. 15/847,704, filed Dec. 19, 2017, which is a continuation of U.S. application Ser. No. 15/589,742, filed May 8, 2017 (now U.S. Pat. No. 9,875,598), which is a continuation of U.S. application Ser. No. 14/248,053, filed Apr. 8, 2014 (now U.S. Pat. No. 9,659,447). The foregoing applications and corresponding U.S. Patents are incorporated herein by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

This disclosure is directed to wagering games, systems and methods, and in particular to augmented approaches to wagering on sporting events.

BACKGROUND

Very often, there is more than one sport event occurring simultaneously. During an NFL season, for example there may be four or more games being played alongside other events such as NBA and NHL contests. Internationally, it is common for seven or more games to be played in the English Premier League simultaneously.

A conventional response to this has been the construction of huge Sports Book areas within casinos. While impressive to look at, the number of displays can be intimidating and does not necessarily aid a player in choosing which game on which to place wagers. The long list of posted odds is complicated to navigate, and isn't updated very often because a complicated, quick updating display would be even harder for players to follow.

Thus, there exists a strong need for simpler betting interfaces, targeted towards what a particular player is interested in. Ideally, these interfaces should be able to predict what a player is likely to be interested in before the player has made a decision to place a bet.

This present disclosure aims to solve these problems in a novel and practical way. Multiple different implementations are contemplated, encompassing both the home and the casino as locations for wagering. This disclosure describes how it may be determined which sporting event is being watched by a bettor, and therefore how context-sensitive betting options can be presented to the bettor in real-time, tailored to the sporting event being watched.

While conventional sporting wagering games, systems and methods include features which have proved to be successful, there remains a need for features that provide players with enhanced excitement and an increased opportunity of convenient participation and winning. The present disclosure addresses these and other needs.

SUMMARY

Briefly, and in general terms, the present disclosure is directed towards a method and system for augmented wagering. In one aspect, the wagering can be conducted for sports betting.

In at least one implementation, the system augments content for an active event subject to a focus of a user, in an environment including a presentation of two or more active events. The system includes: a user focus determination unit including a camera that captures video data associated with the focus of the user; a memory and a buffer that store digital fingerprints from the events; an active content determination component that compares one or more digital fingerprints from an active event with the captured video for determination of the event being focused on by the user; and a display that displays content and augments the determined active event being focused upon by the user that was identified by the active content determination component.

In some implementations of the content augmentation system, the buffer is a circular buffer. In other implementations of the content augmentation system, the buffer is a time-stamped circular buffer. In still other implementations, the content augmentation system further includes a user focus determination unit having an apparatus for generating data indicative of the geographical location of the unit. In yet other implementations, the content augmentation system further includes a user focus determination unit having a microphone that captures fingerprint data associated with the events. The active content determination component buffer is configured to store audio fingerprints of active events. The active content determination component is further configured to compare a digital fingerprint from an active event with the captured fingerprint data for determination of the event being focused on by the user.

In another implementation, the system provides augmenting content to an event, from a group of presented events, focused upon by a user using a mobile device including a video camera and microphone. Such a system includes: a server; a memory storing one or both of contemporaneous digital video and audio fingerprints for the events; a video display; and a communication network that connects the video display, the server, and the memory. The mobile device is configured by an application to provide one or more of video and audio data associated with a selected event focused upon by the user for one or more of the server and mobile device to compare with the stored digital fingerprint data and determine the event focused upon by the user for display at the video display. In the system, one or more of the server and the mobile device also provides video content that augments the display of the event at the video display.

In some implementations of the content augmentation system, the mobile device includes a component that determines the geographic location of the mobile device. The system further includes one or more of a mobile device and a server configured to receive data from the component and determine the event focused upon by the user. In other implementations of the content augmentation system, the component is a GPS sensory component. In still other implementations of the content augmentation system, the mobile device includes one or more sensors selected from a group consisting of: a gyroscope, accelerometer, and compass, the system further comprising one or more of a mobile device and a server configured to receive data from the sensors and determine the event focused upon by the user.

In one embodiment, the wagering method and system operates to bring context-sensitive betting options to a player with no effort on the player's behalf. The contemplated approaches allow promotion of instant/time-sensitive propositions and simplify betting for inexperienced players, and for more experienced players provide a better targeted experience. Moreover, this system and method integrates with other initiatives such as E-Wallet. Also, multiple methods are used to determine games being watched, thus being resilient to many different modes of operation. Furthermore, failure modes are graceful in that a player may be presented with less relevant betting options.

In one currently preferred implementation, the method and system employs a standard mobile device such as an Apple iPad (late 2012 model) or Google Nexus 10, along with WiFi or 3G/4G/LTE backhaul. An internet based server hosting audio fingerprint comparison software is contemplated along with circular buffers of all currently broadcast sport-event related audio from TV networks. Optionally, Google Glass can be employed as a camera for capturing images of TV being watched for fingerprinting. Further, DirecTV Set top boxes with external (whole home DVR) access enabled are contemplated.

In one or more other approaches, the method and system can include audio fingerprint comparison of live TV to detect channel being watched. Further, use of SLAM technology is contemplated to determine which TV is being watched in a multiple TV situation such as a Sports Book. Also contemplated is analysis of broadcast station watermarks to detect channel being watched.

Features and advantages will become apparent from the following detailed description, taken in conjunction with the accompanying drawings, which illustrate by way of example, the features of the various embodiments.

BRIEF DESCRIPTION OF THE DRAWINGS

FIG. 6 illustrates an example of JSON output from a receiver via UPNP.

DETAILED DESCRIPTION

Figure 1:
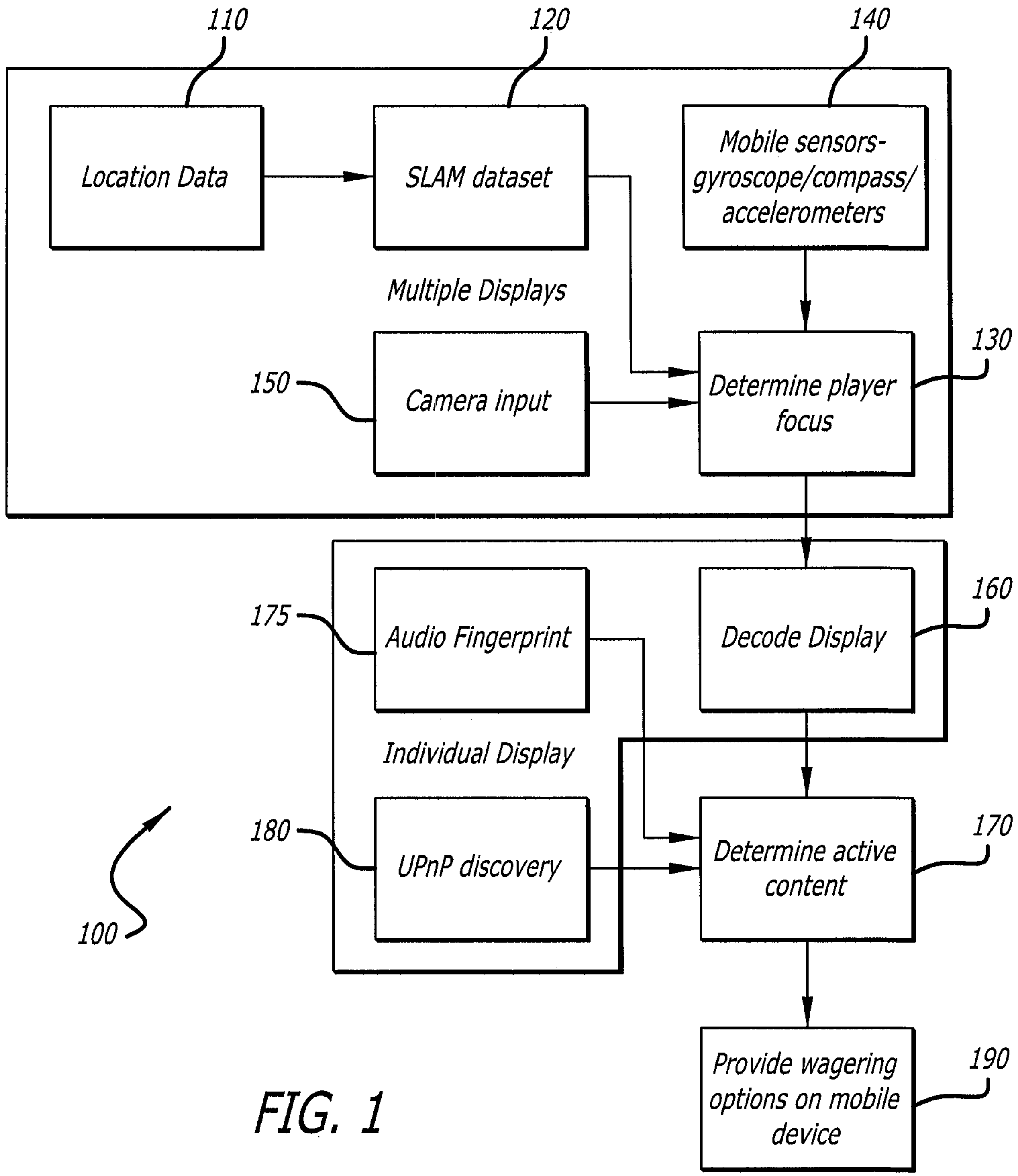
FIG. 1 illustrates a logic flow diagram of an overall wagering system operation.

Various embodiments are directed to a game, gaming machine, gaming systems and method for playing a game. The embodiments are illustrated and described herein, by way of example only, and not by way of limitation. Referring now to the drawings, and more particularly to FIGS. 1-8, there are shown illustrative examples of games, gaming machines, gaming systems and methods for playing a game in accordance with various aspects of the gaming system which includes aspects of augmented gaming.

With reference to FIG. 1, there is shown a proposed overall system 100 including both individual display mode (typically the home, or alternatively being delivered as a sub-screen of a Bally display manager (DM) solution) and multiple display mode (typically a casino sportsbook).

The difference between these modes is that in the home or at an electronic gaming machine (EGM) equipped with DM sports it can usually be expected that the player is only looking at one TV channel at a time (with some exceptions which will be discussed below). In contrast, at a sports book it is inevitable that multiple displays will be active simultaneously. Thus, a first aspect of this contemplated approach in the sports book is concerned with determining which TV is being mainly watched by the player.

Thus, in one contemplated approach, a system or method to determine a person's focus from within an environment including a single or multiple object of attention is employed. In a first step, location data 110 is inputted into or communicated to a simultaneous location and mapping (SLAM) operational system 120 that receives, analyzes and/or manipulates location data. The SLAM operational system develops a collection of related sets of location information composed of separate elements but which are manipulatable as a unit. Such location data can be an indication of various factors, such as a location of a person, place or device and can be collected via various sources such as GPS or other sensory systems and devices. This information is one component which can be employed to determine a player's focus 130.

Mobile sensors 140, such as gyroscopes, compasses and/or accelerometers can act as a further source of information for determination of a player focus 130. These and other sensory devices can be incorporated into various devices which a player carries or possesses. In this way, player movement and orientation can be tracked and analyzed, and form a component of assessing focus.

Also inputted into a player focus determination can be a camera input 150. The camera can again be any device where it is carried or possessed by a player, or which is otherwise oriented to best capture aspects of a player's focus. Here, it is contemplated that both broad and/or micro movements associated with a player's focus can be captured using the camera input. Further, it is contemplated that time spent in an area, or a direction of attention can be tracked using the camera input to add further details concerning a player's interest.

An aggregate or weighted and analyzed focus of a player is then calculated to best estimate the directional interest of a player. A single display upon which the player has directed an interest is identified. This display is then decoded 160 by the overall system. The decoded display information is communicated to determine active content 170 of the display.

Audio fingerprints 175 of a display which has been determined as a focus viewing point can also be gathered. This information is analyzed (described below) to determine active content.

Also employed to facilitate the determination of active content is a universal plug and play (UPuP) set of networking protocols. These protocols enable networked devices to discover the presence on the network of other devices and to establish a functional network for sharing. That is, UPuP discovery is conducted and the information gleaned is also communicated to determine active content.

Once the active content has been identified, the system 100 generates then provides wagering options to a player 190. In one specific embodiment, these options are transmitted to a player's cell phone, PDA or other computerized device.

Figure 2:
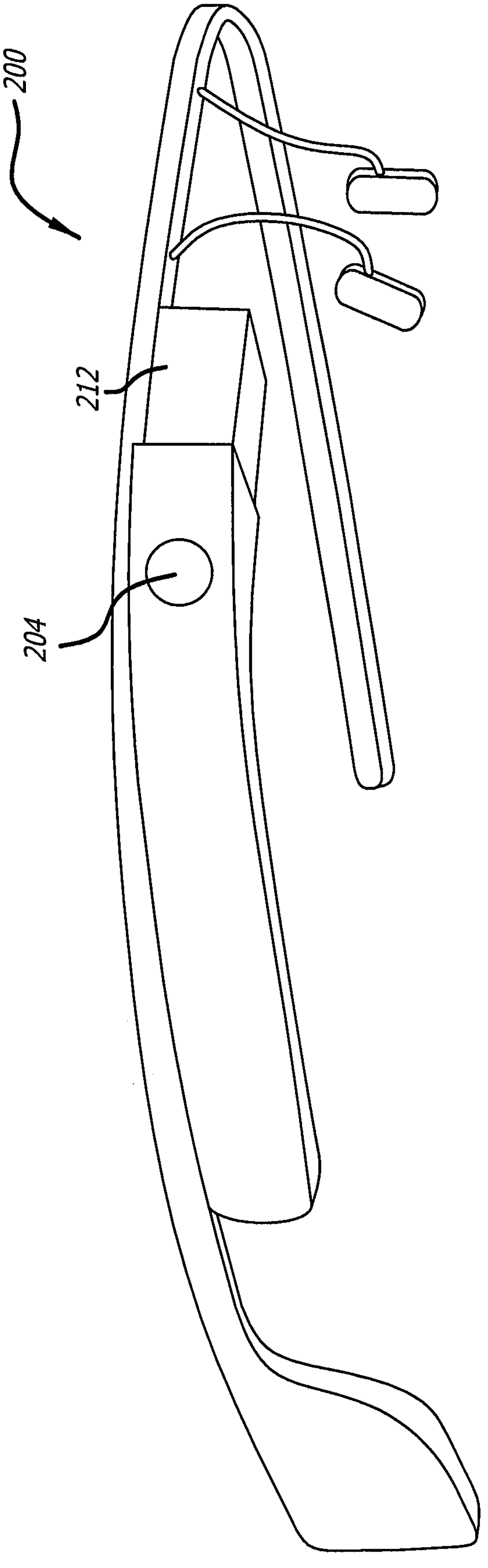
FIG. 2 illustrates an example of an augmented reality application that incorporates glasses.

FIG. 2 shows an example of augmented reality glasses 200 including a display 212. In the present example, “Glass” as shown has been developed by Google and includes some features that make it useful for augmented wagering. Firstly, it includes a camera 204 that aims outwards from the user. This reasonably captures what the user is focusing upon (there is some basic eye-tracking in Google Glass, but it can be limited to determining if the user is looking up at the inbuilt projected display 212). It is contemplated that accurate eye-tracking can be integrated into augmented reality glasses 200, which will allow accurate determination of what is being looked at. Without eye tracking, however, the present system and method can operate effectively by taking multiple samples of camera input and using these multiple samples over time to determine the display of interest being most viewed. This information can be collected and inputted into the system 100 to determine player focus 130.

While it may be possible to determine which display is being generally viewed in a sportsbook, the content of this display may be harder to determine. Accordingly, as stated, it is proposed that the use of SLAM that is contemplated. SLAM was originally developed by NASA to allow robots to operate on Mars. A robot landing on Mars has limited information about topography, mainly from low-resolution satellite photos. As the rover moves around Mars it sends data back to mission control consisting of camera images and other sensors such as gyroscopes and compasses. From this data a 3D map is made which is fed back to the robot to enable it to navigate the environment better.

In the mobile device space, SLAM is the $4^{th}$ generation of augmented reality tracking. The first generation—printed markers such as QR codes are widely used. The $2^{nd}$ generation—image markers were used in the gaming industry. The $3^{rd}$ generation of tracking is object tracking, and is now becoming widely available on the market. This allows, for example, the identification of components within an electronic gaming machine.

SLAM takes these technologies to the next stage. A 3D representation of an environment such as the interior of a casino can be captured by a mobile device using only its inbuilt camera and sensors. In this context, a representation is captured initially by an interested party such as the casino owner, and stored in the cloud for access by mobile devices later.

Figure 3:
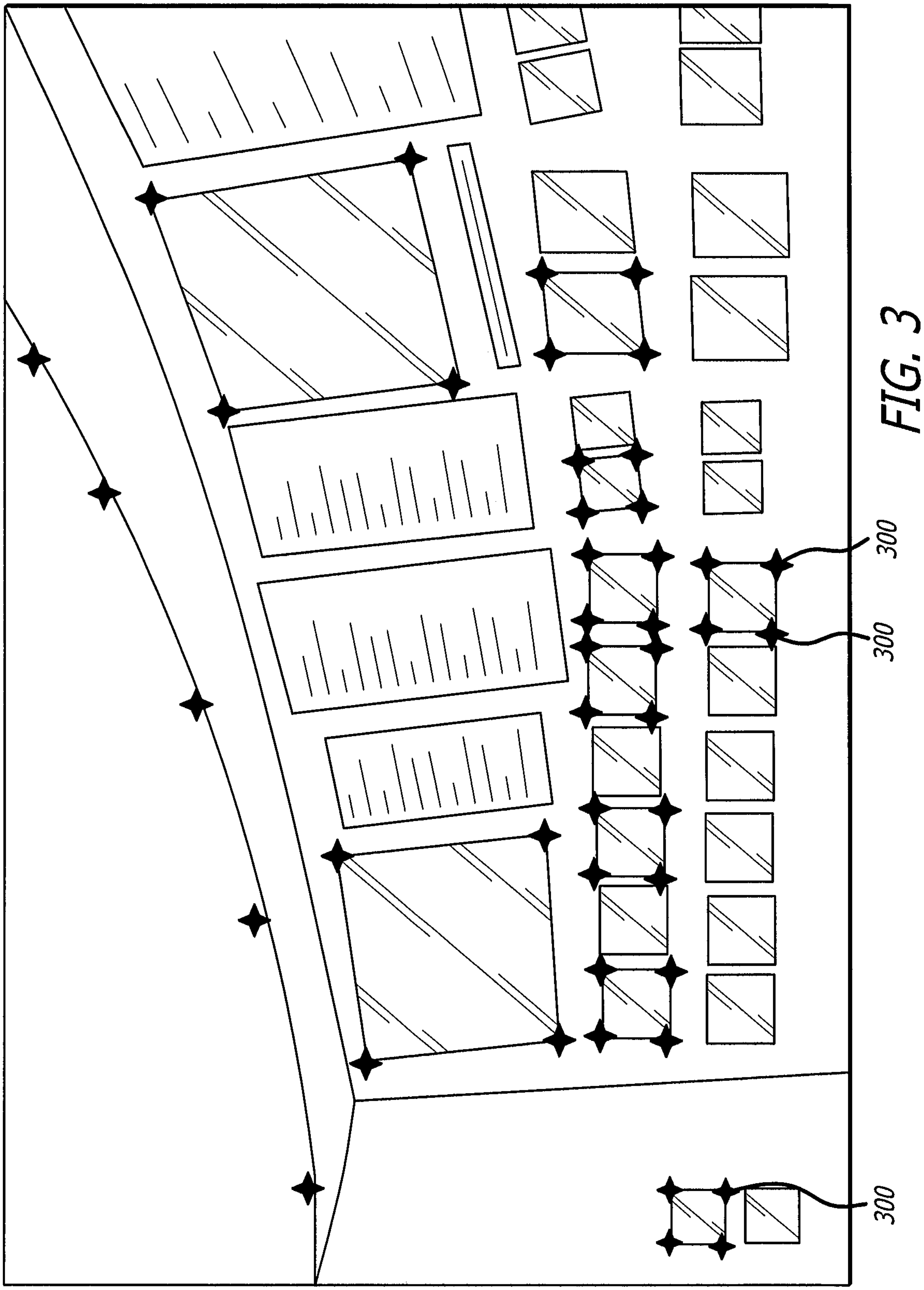
FIG. 3 illustrates a system involving SLAM registration points.

Turning to FIG. 3, an example is shown of how this data is then used by the camera input of the augmented reality glasses. Each ‘star’ 300 on the image represents a point that the SLAM capture system has identified. The particular set of SLAM data would be chosen by use of a positioning system such as GPS. It is important to note that this system does not require highly accurate positioning, which may not be possible indoors with GPS. Rather, the mobile device would download or access SLAM data files for a particular location such as a casino or part of a casino.

Using this SLAM data, along with sensors such as its inbuilt compass, the camera 204 of the glasses 200 is able to identify these ‘star’ points in its image, corresponding to the previously stored points 300. By comparing the topography of the points 300, the glasses are able to determine accurately the position and orientation of the player inside the casino.

Once the position and orientation of the player has been determined, raycasting from this position through the 3D environment previously stored is conducted to determine which display is currently being watched by the player. Preferably, knowing which display is being watched in the casino environment allows knowing what sport event is being watched, since as part of this system, the casino would maintain a live database table of display identifiers matched with TV channels, and thus sporting events.

Even if such a table is not maintained in certain applications, the problem of delivering player focus has been reduced to identify which sporting event is being watched based upon capturing a TV output. This is the same problem that needs to be solved in a home environment, so both scenarios can now be jointly considered.

Figure 4:
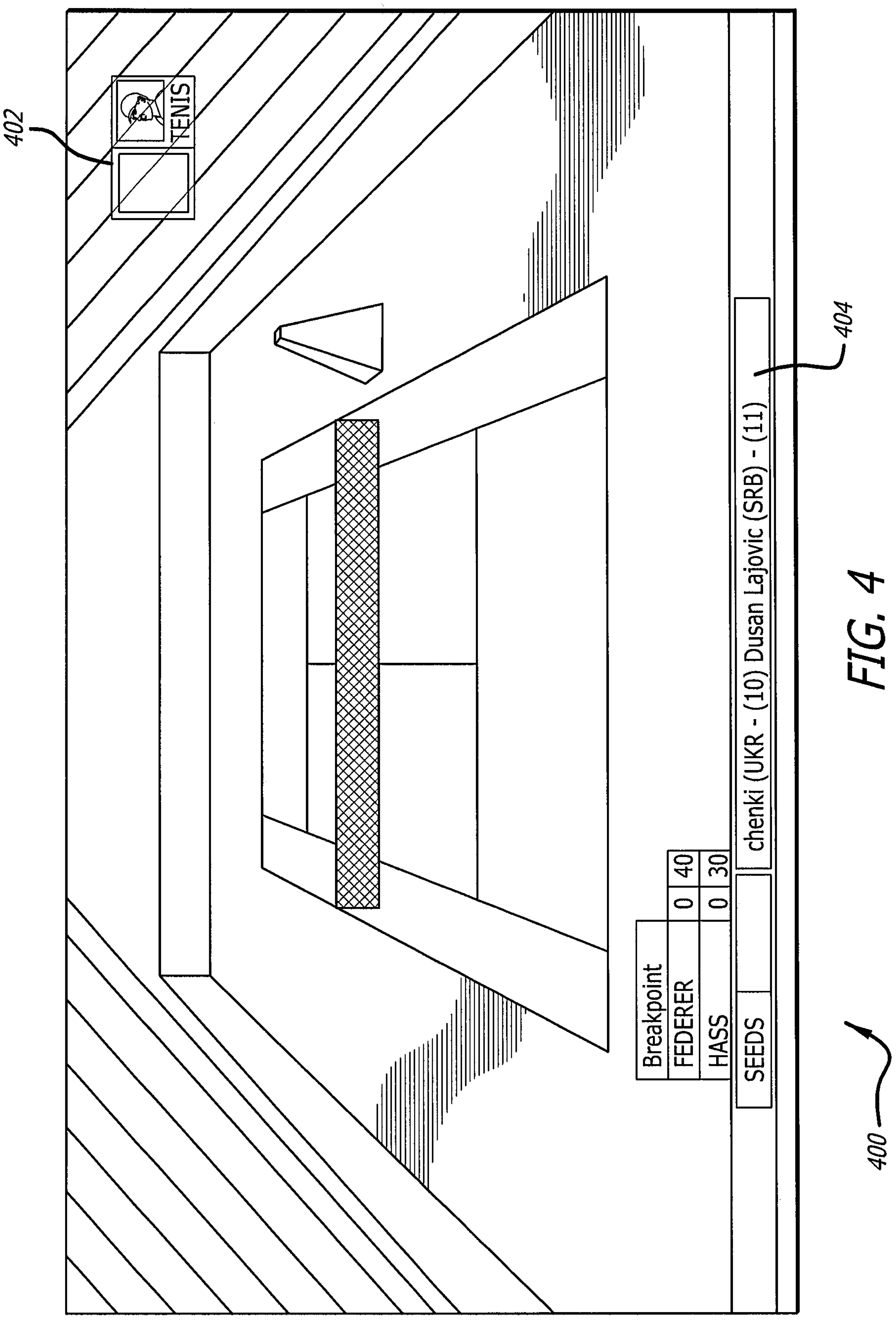
FIG. 4 illustrates a system including identifiers for determining a channel being viewed.

FIG. 4 shows the typical output from a TV 400 showing a sporting event. As can be seen there are two main areas that are of interest for identification purposes. Firstly, most if not all TV channels now permanently display watermarks 402 to uniquely identify the channel. Second, most if not all sports TV channels also display an information panel at the top or bottom of the screen, known in the industry as ‘chrome’ 404.

Both of these features can be reliably used to identify the channel by using techniques previously disclosed in application Ser. No. 13/918,741 entitled “Complex Augmented Reality Image Tags,” the contents of which are incorporated by reference. Experience has shown that this technique is more than robust enough to work with existing technology.

It is to be noted that the present system and method do not particularly require instant identification of a TV channel. It may be beneficial, in fact, to have the identification process spread over a period of up to at least a minute or more to ensure higher accuracy and less false-positives and determine that an appropriate level of engagement has been met by the bettor such that bets may be offered in a way that are relevant.

Figure 5:
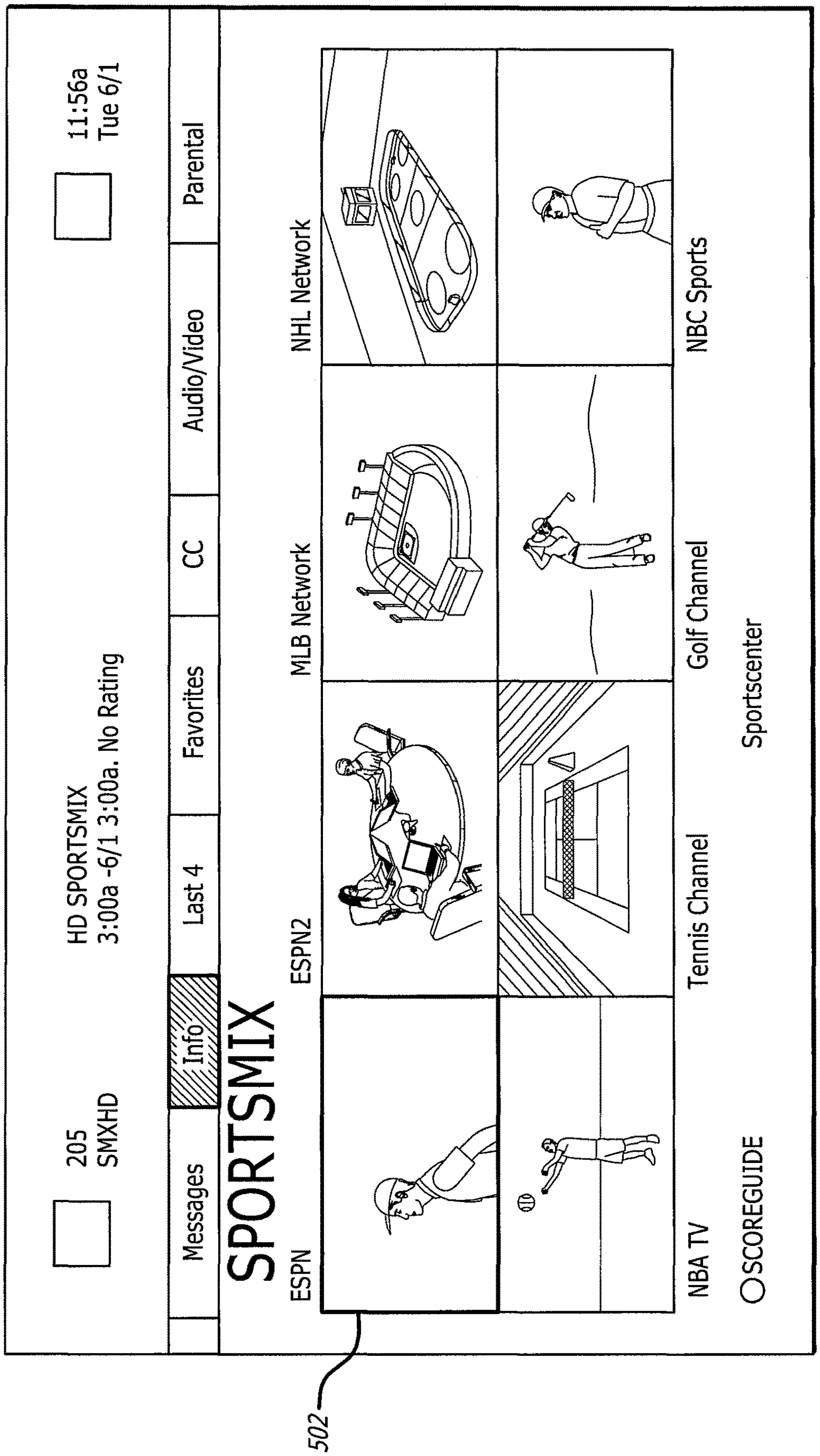
FIG. 5 illustrates a system involving multiple channels with a single audio track.
Figure 7:
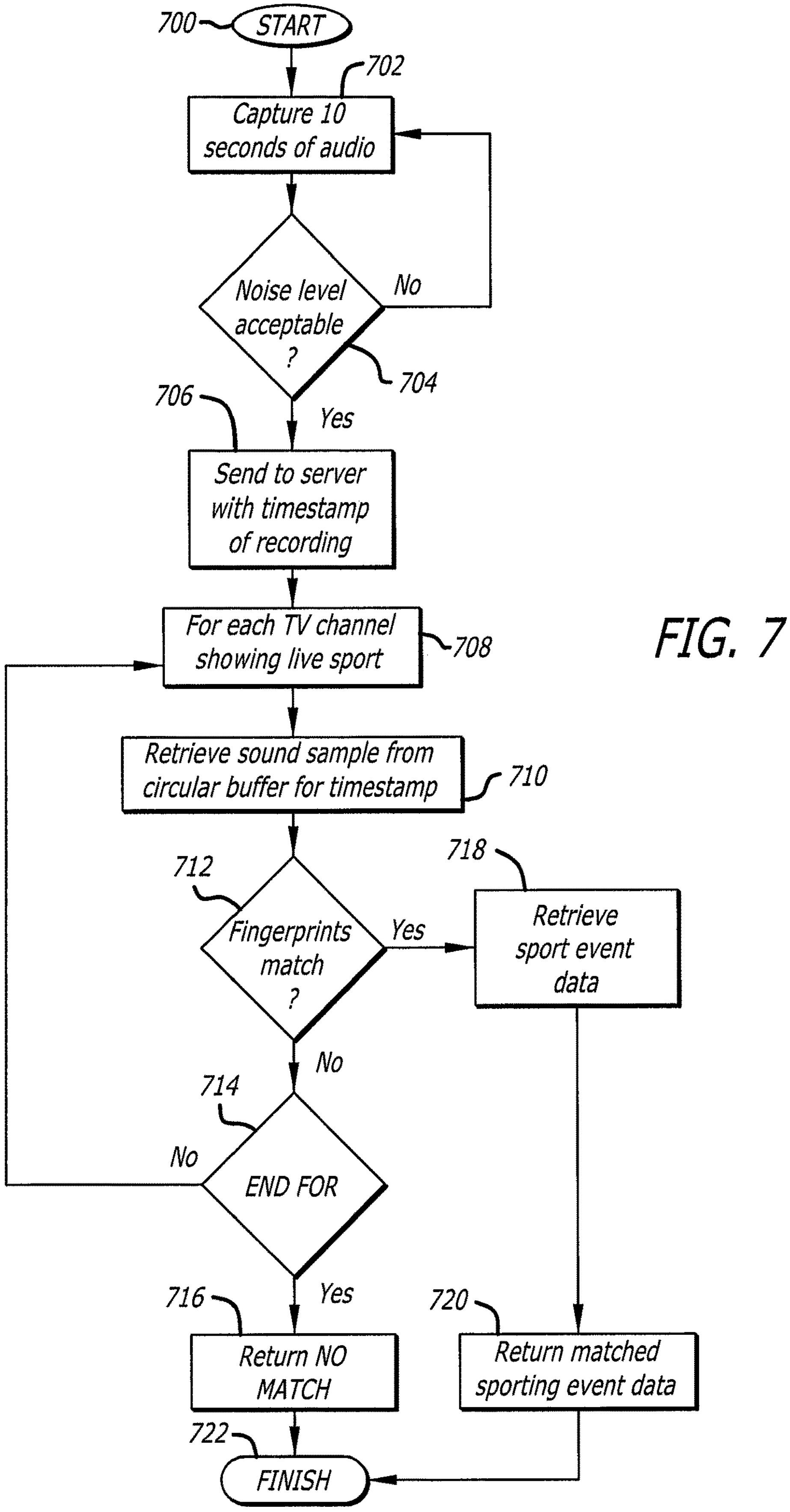
FIG. 7 illustrates a flow chart respecting a process to determine sport events from an audio fingerprint.

Turning now to FIG. 5, there is shown another typical output 500 from a TV being used by a sports bettor. In this example, there are eight sports being shown at a particular time, so that a viewer may not miss any action. This mode is commonly used by bettors during events where multiple sports events occur simultaneously, for example, on the first day of “March Madness,” or the last day of the English Premier League season.

Because it is not realistic to determine which of the events the bettor is watching, it may be appropriate to offer bets for all of these events. Identification of this particular mix of events can again be done by use of image tracking. In this example, a “DirecTV” logo would be tracked to determine that this is the “SportsMix” channel.

One other contemplated feature allows targeting of the sporting event of most interest to the viewer. While a person can easily watch multiple events simultaneously, it is much more difficult to listen to multiple events simultaneously. To solve this, almost every sportsbook venue, and every mix of multiple video streams in the home mutes every audio track except for one. In the example shown, there is a box to highlight the video stream 502 which is selected for audio. The viewer is able to change the audio selection with a remote control.

The mobile devices contemplated for use with the present method and system, be it glasses, smart phone or tablet, has network connectivity and audio recording capability via a microphone. Thus, the microphone on a tablet, phone or glasses (See FIG. 1; 165) can be employed to record the audio from the TV.

In another approach, a Java Script Object Notification (JSON) output from a receiving (e.g. DirecTV) can be interpreted using UPuP. FIG. 6 relates to an alternative approach that may also be used to retrieve sporting event data for a particular TV. This approach may only work with one active TV channel, but is still useful because it is highly accurate and simple to implement. In this approach, the mobile device is connected via WiFi to a home network which also has set top boxes for decoding Satellite TV also attached. Such an arrangement is now common with the advent of 'Whole Home DVR' solutions from DirecTV, Dish and cable/fiber providers.

It is thus a feature of set top boxes that they can be addressed over the home network. Such a feature is used so that one set top box can retrieve the contents of the DVR of another box. Thus, FIG. 6 is the output from a DirecTV set top box, simply executing a HTTP request of '"http://<SET TOP IP ADDRESS>:8080/tv/getTuned", where <SET TOP IP ADDRESS> is the local IP address of the set top box. To determine the Internet Protocol addresses of set top boxes on the local network, the mobile device may use known technologies such as UPnP to discover 180 all set top boxes matching a certain criteria (such as being named "DirecTV").

If more than one set top box is found on the local network by the mobile device, then each may be queried in turn, and if only one is showing a live sporting event that would be the source for betting information. If more than one is showing a live sporting event, audio fingerprinting could be used, or a mix or more than one sport event could be combined in the betting interface.

It is now well established that digital fingerprints can be taken from an audio sample and compared against a database to identify the audio sample. Examples of such technology are the 'Shazam' and 'Soundhound' applications for mobile phones.

Shazam, in particular, works as follows (information taken from Wikipedia):

"Shazam identifies songs based on an audio fingerprint based on a time-frequency graph called a spectrogram.

Shazam stores a catalog of audio fingerprints in a database. The user tags a song for 10 seconds and the application creates an audio fingerprint based on some of the anchors of the simplified spectrogram and the target area between them. For each point of the target area, they create a hash value that is the combination of the frequency at which the anchor point is located, the frequency at which the point in the target zone is located, and the time difference between the point in the target zone and when the anchor point is located in the song.

Once the fingerprint of the audio is created, Shazam starts the search for matches in the database. If there is a match, the information is returned to the user, otherwise it returns an error.

Shazam can identify prerecorded music being broadcast from any source, such as a radio, television, cinema or club, provided that the background noise level is not high enough to prevent an acoustic fingerprint being taken, and that the song is present in the software's database."

Thus, instead of using an existing database, the audio match may be made against a set of circular audio buffers stored on a server. The process for achieving this will next be described with respect to FIG. 7.

First, the bettor initiates a betting application 700 on their mobile device, be it a phone or tablet.

This application passively captures audio in segments of appropriate length, for example, for ten seconds at a time 702. This ten seconds is analyzed to compute a digital fingerprint, and if it is deemed acceptable 704 (too much background noise may corrupt the fingerprint) it is transmitted to a server connected to the internet over WiFi/3G/4G/LTE. If the noise level is unacceptable, another segment of audio is captured and analyzed for acceptance. When an acceptable noise level is captured, the audio information is timestamped and relayed to a server 706.

The server maintains a list of active sporting TV channels 708. Preferably, the mobile device also transmits gross location data which enable the server to determine which market the bettor is in. The mobile device can also transmit the timestamp with the fingerprint. Assuming normal network conditions, such a fingerprint could be easily transmitted within a few seconds of computation.

The server, meanwhile, is continuously generating audio fingerprints for each active sport TV channel. These audio fingerprints are stored in a time-stamped circular buffer 710, so that the last, say 5 minutes (or a portion thereof), of audio generated by each TV channel may be audio fingerprint matched 712. If there is no match 714, the system returns to examining the list of active sporting events. When a "no match" occurs a subsequent time 716, the inquiry finishes. The number of "no matches" to reach a finish event can be set to any number. While the buffer could technically be larger, given the focus of real-time betting options to a bettor, it may not beneficial to make matches further back in time. Restricting the fingerprints to a short period of time means that if a bettor 'pauses' their TV DVR for a substantial time they will lose the ability to receive live betting updates. This might be seen as a desirable feature to the bettor because they would not wish to receive updates that may pre-empt their enjoyment of the game being watched on delay (such as the result).

Once the TV channel has been identified by the audio fingerprint, it is a straightforward operation for the server to determine the sporting event being broadcast by the channel using publically available TV listing information 718. The sporting event data can thus be passed back to the mobile device 720 at Finish 722.

In yet another alternative for determining the channel being watched, closed caption (CC) data could be captured and recognized using OCR technology. So in the case where a bettor has their TV on mute, or is in a sports bar environment where no audio is present, but CC text is shown on TV, the CC text would be recognized and passed to the server for comparison against a circular buffer of CC text from each active TV channel in the local market.

Figure 8:
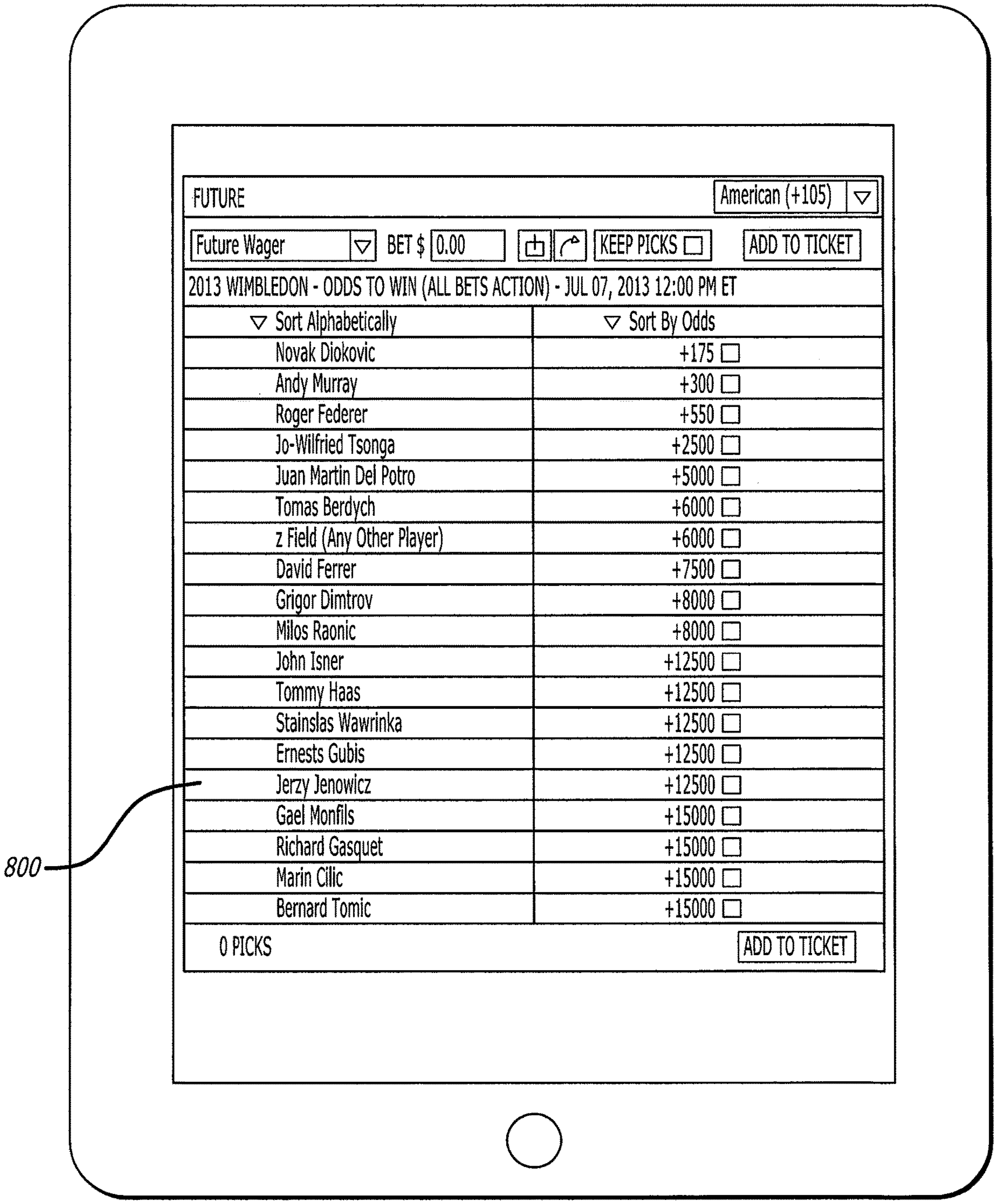
FIG. 8 illustrates a tablet that is displaying an example output from an augmented reality venue application.

In one implementation, the primary delivery surface for the betting interface can be a mobile device such as an iPad or other tablet. While wagers may be presented to a better via augmented glasses, it is also contemplated that the glasses be mainly used as a way of indicating to the bettor that context-sensitive bets have been made available on their tablet. A bettor could then peruse the bets at their leisure on the tablet 800, as shown in FIG. 8.

Accordingly, an augmented wagering system and method have been disclosed. Real time betting options can thus be presented to a bettor. In this way, players are provided with enhanced excitement and increased opportunities for participation and winning.

Those skilled in the art will readily recognize various modifications and changes that may be made to the claimed systems and methods without following the example embodiments and applications illustrated and described herein, and without departing from the true spirit and scope of the claimed systems and methods.

What is claimed is:

1. A mobile apparatus for displaying augmented wagering content, the mobile apparatus comprising:

a camera configured to capture video data in an environment including a presentation of a plurality of active events on one or more event displays; and a display configured to display content to a user of the mobile apparatus, wherein the mobile apparatus is configured to:

determine a focused-on active event, from the plurality of active events, within the captured video data;

generate a plurality of wagering options associated with the focused-on active event;

display, via the display, at least a portion of the focused-on active event and the plurality of wagering options concurrently; and receive user input selecting a wagering option of the plurality of wagering options to place a wager associated with the focused-on active event.

2. The mobile apparatus of claim 1 further comprising at least one sensor configured to collect sensor data, the at least one sensor comprising the camera, wherein the mobile apparatus is configured to compute a digital fingerprint of the focused-on active event using the collected sensor data.

3. The mobile apparatus of claim 2, wherein the mobile apparatus is configured to determine the focused-on active event based at least partially on the digital fingerprint by comparing the digital fingerprint to a plurality of known digital fingerprints stored in a memory device.

4. The mobile apparatus of claim 2, wherein the mobile apparatus is configured to determine the focused-on active event by aggregating and analyzing at least one of the captured video data, location data generated based on the collected sensor data, or an audio sample collected by a microphone of the mobile apparatus.

5. The mobile apparatus of claim 2, wherein the focused-on active event is determined based on at least one or more of location data captured by the at least one sensor, an audio sample of the digital fingerprint, or video data of the digital fingerprint.

6. The mobile apparatus of claim 1, wherein the mobile apparatus is a smartphone or a tablet.

7. The mobile apparatus of claim 1, wherein the focused-on active event is a sporting event.

8. A method for displaying augmented wagering content, the method comprising:

capturing, via a camera of a mobile apparatus, video data in an environment including a presentation of a plurality of active events on one or more event displays;

displaying, on a display of the mobile apparatus, content to a user of the mobile apparatus;

determining a focused-on active event, from the plurality of active events, within the captured video data;

generating a plurality of wagering options associated with the focused-on active event;

displaying, via the display, at least a portion of the focused-on active event and the plurality of wagering options concurrently; and receiving, at the mobile apparatus, user input selecting a wagering option of the plurality of wagering options to place a wager associated with the focused-on active event.

9. The method of claim 8, wherein determining the focused-on active event comprises:

collecting, via at least one sensor comprising the camera, sensor data; and computing a digital fingerprint of the focused-on active event using the collected sensor data.

10. The method of claim 9, wherein the focused-on active event is determined based at least partially on the digital fingerprint by comparing the digital fingerprint to a plurality of known digital fingerprints stored in a memory device.

11. The method of claim 9, wherein the focused-on active event is determined by aggregating and analyzing, by at least one of the mobile apparatus and a server, at least one of the captured video data, location data generated based on the collected sensor data, or an audio sample collected by a microphone of the mobile apparatus.

12. The method of claim 9, wherein the focused-on active event is determined based on at least one or more of location data captured by the at least one sensor, an audio sample of the digital fingerprint, or video data of the digital fingerprint.

13. The method of claim 8 further comprising identifying the one or more event displays and the plurality of active events by analyzing the captured video data.

14. The method of claim 8, wherein the mobile apparatus is a smartphone or a tablet.

15. A system for displaying augmented wagering content, the system configured to:

capture, via a camera of a mobile apparatus, video data in an environment including a presentation of a plurality of active events on one or more event displays;

display, on a display of the mobile apparatus, content to a user of the mobile apparatus;

determine a focused-on active event, from the plurality of active events, within the captured video data;

generate a plurality of wagering options associated with the focused-on active event;

display, via the display, at least a portion of the focused-on active event and the plurality of wagering options concurrently; and receive, at the mobile apparatus, user input selecting a wagering option of the plurality of wagering options to place a wager associated with the focused-on active event.

16. The system of claim 15, wherein the mobile apparatus includes at least one sensor configured to collect sensor data, the at least one sensor comprising the camera, wherein the system is configured to compute a digital fingerprint of the focused-on active event using the collected sensor data.

17. The system of claim 16, wherein the system is configured to determine the focused-on active event based at least partially on the digital fingerprint by comparing the digital fingerprint to a plurality of known digital fingerprints stored in a memory device.

18. The system of claim 16, wherein the system is configured to determine the focused-on active event by aggregating and analyzing at least one of the captured video data, location data generated based on the collected sensor data, or an audio sample collected by a microphone of the mobile apparatus.

19. The system of claim 16, wherein the focused-on active event is determined based on at least one or more of location data captured by the at least one sensor, an audio sample of the digital fingerprint, or video data of the digital fingerprint.

20. The system of claim 15 further comprising a server configured to determine the focused-on active event and notify the mobile apparatus of the determination.

* * * * *